United States Patent [19]

Smiley et al.

[11] 4,183,991
[45] Jan. 15, 1980

[54] PROCESS FOR PREPARING HIGHLY FILLED ACRYLIC ARTICLES

[75] Inventors: Leonard H. Smiley, Jenkintown; Howard L. Tigelaar, Levittown, both of Pa.

[73] Assignee: Rohm and Haas Company, Philadelphia, Pa.

[21] Appl. No.: 793,229

[22] Filed: May 2, 1977

[51] Int. Cl.$^2$ .............................................. B29D 7/00
[52] U.S. Cl. ................................ 428/220; 260/42.52; 264/73; 264/216; 264/329; 264/331
[58] Field of Search ................. 264/331, 73, 216, 329; 260/42.52; 428/220

[56] References Cited

U.S. PATENT DOCUMENTS

| | | | |
|---|---|---|---|
| 2,199,557 | 5/1940 | Charlton et al. | 260/42.52 |
| 2,373,488 | 4/1945 | Marks | 264/331 |
| 2,972,170 | 2/1961 | Birckhead, Jr. et al. | 264/331 |
| 3,050,785 | 8/1962 | Cunningham | 264/73 |
| 3,060,148 | 10/1962 | Evans et al. | 260/42.52 |
| 3,780,156 | 12/1973 | Cameron | 264/300 |
| 3,827,933 | 8/1974 | Duggins et al. | 264/331 |
| 3,847,865 | 11/1974 | Duggins | 260/42.52 |
| 3,966,572 | 6/1976 | Carder | 260/42.52 |

*Primary Examiner*—Jeffery R. Thurlow
*Attorney, Agent, or Firm*—Michael B. Fein; Lester E. Johnson

[57] ABSTRACT

Disclosed herein is a process for preparing highly filled acrylic articles comprising:
(a) providing a solution of an acid-functional acrylic polymer-in-monomer solution;
(b) mixing into said solution a catalytic amount of polymerization promoter system;
(c) blending into said mixture 40 percent to 80 percent inert particulate filler to form a casting mixture;
(d) introducing said casting mixture to a mold; and
(e) curing said molded casting mixture;

whereby the viscosity of said casting mixture is controlled and the settling of said filler is minimized by the presence of units from said carboxylic acid in said polymer.

18 Claims, No Drawings

PROCESS FOR PREPARING HIGHLY FILLED ACRYLIC ARTICLES

This invention relates to a process for preparing highly filled acryic articles and to articles prepared thereby. More particularly, it relates to a process for preparing acrylic sheet characterized by high flame retardancy, low smoke evolution, ease of handleability and fabrication, high chemical and stain resistance, and by finite thickness control. Such sheet has a variety of applications, such as for surfacing material in bathroom, kitchen, and various indoor and outdoor architectural applications. Fillers are introduced into resins to impart cost reduction, reinforcement, flame retardancy, and marble-like appearance. For flame retardancy and cost reduction, high levels of filler are desirable. At low to moderate levels of filler, viscosity is low and settling of the dense filler particles occurs rapidly. As the level of filler is increased, viscosity increases rapidly and the mixes become increasingly thixotropic with the result that filled resin pastes are difficult to handle and separation is still a problem. Some improvement is offered by Cameron, U.S. Pat. No. 3,780,156, who describes a process for decreasing the viscosity of a polymerizable mixture of a filled polymerizable polymer in monomer mixture by the further addition of aliphatic monoacid viscosity modifiers.

It is an object of the present invention to provide an improved process for preparing highly filled acrylic articles.

A further object is to provide an improved process for preparing highly filled acrylic sheet.

A still further object is to provide improved highly filled acrylic articles.

Still another object is to provide highly filled acrylic sheet by the process of this invention.

These objects and others which will become apparent are achieved by the present invention which comprises an improved process for preparing highly filled acrylic articles comprising:

(a) providing a solution of polymer in monomer wherein (i) said polymer is polymerized from a mixture comprising at least 50 percent by weight $C_{1-8}$ alkyl methacrylate or mixtures thereof and 0.01 percent to 8 percent by weight copolymerizable ethylenically unsaturated carboxylic acid; and (ii) said monomer comprises at least 50 percent by weight $C_{1-8}$ alkyl methacrylate or mixtures thereof;

(b) mixing into said solution a catalytic amount of a polymerization promoter system;

(c) blending into the mixture from (b) above 40 percent to 80 percent inert particulate filler, based on total amount, to form a casting mixture;

(d) introducing said casting mixture to a mold; and (e) curing said molded casting mixture;

whereby the viscosity of said casting mixture is controlled and the settling of said filler is minimized by the presence of units from said carboxylic acid in said polymer. In a further aspect, the invention comprises an improved process for preparing highly filled acrylic sheet by the process as set forth immediately above. In a still further aspect, this invention comprises the articles produced by this process. In still another aspect, the invention comprises the sheet produced by this process.

As stated hereinabove, the polymer used in this invention is polymerized from a mixture comprising at least 50 percent by weight of any $C_{1-8}$ alkyl methacrylate or mixtures thereof and 0.01 percent to 8 percent by weight of a copolymerizable ethylenically unsaturated carboxylic acid selected from the group consisting of methacrylic and acrylic acids. The balance of said mixture, to total 100 weight percent, further comprises one or more copolymerizable compounds selected from the group consisting of $C_{1-8}$ alkyl acrylates, styrene, alkyl styrenes, vinyl acetate, acrylonitrile, and methacrylonitrile. Preferably, the polymers used in this invention have a molecular weight of from about 20,000 to 100,000. More preferably, the polymers have a molecular weight of from about 40,000 to 90,000. Most preferably, the polymers have a molecular weight of from about 50,000 to 80,000. Surprisingly, the presence of the acid moiety in the thermoplastic polymer provides dispersions which are not highly thixotropic; the presence of small levels of acid in the acrylic polymer imparts an optimal combination of low viscosity and low settling performance of the filled casting mixture. It is believed that the polymer molecular weight and the level of acid in the acrylic polymer are interrelated although this interrelationship is not fully understood. Accordingly, the improvements of this invention may be achieved by adjusting the concentration of polymer in the polymer-in-monomer solution while maintaining a given level of acid in the polymer, or by adjusting the level of acid in the polymer while maintaining a given polymer concentration in the polymer-in-monomer solution, or by simultaneously adjusting both the polymer concentration in the polymer-in-monomer solution and the level of acid in the polymer.

The monomer of the polymer-in-monomer solution comprises at least 50 percent by weight of any $C_{1-8}$ alkyl methacrylate or mixtures thereof, the balance of said monomer to total 100 percent by weight comprising one or more copolymerizable compounds selected from the group consisting of $C_{1-8}$ alkyl acrylates, styrene, alkyl styrenes, vinyl acetate, acrylonitrile, methacrylonitrile, methacrylic acid and acrylic acid.

The polymer-in-monomer solution may further comprise 0.01 to 1.0 percent based on total casting mixture of copolymerizable polyethylenically unsaturated compound selected from the group consisting of alkylene dimethacrylates, trimethacrylates, diacrylates, and triacrylates; divinyl benzene, triallyl cyanurate, and diallyl phthalate. The polymer-in-monomer solution of the process of the invention comprises a polymer:monomer ratio of from 1:9 to 1:1.

The inert particulate filler of this invention is selected from the group consisting of hydrated alumina, calcium carbonate, clays, silicas, silicates, metal oxides, and magnesium oxychloride. More preferred inert fillers used in this invention comprise the group consisting of hydrated alumina and calcium carbonate. Hydrated alumina is the most preferred inert filler.

The casting mixture of this invention comprises 40 percent to 80 percent inert particulate filler based on total amount. More preferably, the casting mixture comprises about 50 percent to 70 percent inert filler. Most preferably, the casting mixture comprises about 60 percent to 67 percent inert filler.

The casting mixture may further comprise fibrous reinforcement to provide added strength to the articles prepared by the process of this invention. Suitable fibrous material is any member selected from the group consisting of inorganic fibers such as, for example, glass fibers or graphite fibers; natural fibers such as, for example, jute, sisal, and bagasse; and synthetic organic fibers, such as, for example, nylon. When fibrous material is used, it is added to the casting mixture in an amount such that up to about 30 percent by weight of the resulting fiber-containing casting mixture comprises the added fibrous material.

The polymerization promoter system used in this invention comprises, based on total casting mixture, about 0.01 to 1.0 parts per hundred of at least one polymerization initiator selected from the group of free radical polymerization catalysts. This polymerization promoter system further comprises, based on total casting mixture, one or more components selected from the group consisting of about 0.01 to 0.5 parts per hundred of one or a mixture of more than one release agent, about 0.01 to 0.5 parts per hundred wetting agent selected from the group of nonionic and anionic surfactants, about 0.01 to 1.0 parts per hundred UV absorber, and about 0.001 to 0.01 parts per hundred polymerization regulator. The release agents used in this invention may be selected from any such well-known commercially available agents including aliphatic monoacids and diacids (for example, Zelec ® UN), lecithin, sulfosuccinates (for example, Aerosol ® OT), and stearic acid. A particularly useful wetting agent is a member selected from the class of ethoxylated alkyl phenols (for example, Triton ® X-100 having an OPE number of 9–10). An especially useful UV absorber agent is a hydroxyphenyl-substituted benzotriazole, which is available commercially as Tinuvin ® P. An example of a useful polymerization regulator agent is a material known as terpinolene (a monocyclic terpene). Preferably, the polymerization promoter system comprises at least one polymerization catalyst selected from the peroxide class. Examples of suitable peroxy catalysts are t-butyl peroxypivalate, acetyl peroxide, and t-butyl peracetate (which are available commercially as Lupersol ® 11, APO ®-25, and Lupersol ® 70, respectively).

The term "mold", as used herein, includes any mold or casting surface. Preferably, the mold used in the process of this invention comprises a member selected from the group consisting of closed cell apparatus, capped open cell apparatus, open-face molds, compression molds, injection molds, and continuous-casting apparatus. The closed cell apparatus includes apparatus used for sheet preparation in both conventional ovencasting operations and in vertical processes. Especially preferred in the practice of this invention is the closed cell cast polymerization process, wherein the closed cell molds are made from glass. When closed cell cast polymerization is practiced, preferably the casting mixture is subjected to reduced pressure of about 25 to 30 psig to remove entrapped volatile gases prior to introducing the casting mixture to the closed cell mold.

In practicing the process of this invention, various techniques may be employed in order to achieve a variety of colors, patterns, and surface structures. A variety of decorations may be imparted to a sheet prepared by the process of this invention by incorporating into the casting mixture any one or more components selected from the group consisting of opacifiers, pigments, metallic flakes, unpigmented or pigmented concentrates based on isotactic poly(methyl methacrylate) for marbleizing or veining, and particulate matter such as white bar sand, red brick dust, and gray cinder dust. An especially useful process for incorporating the isotactic poly(methyl methacrylate) concentrate mentioned above is described in U.S. Pat. No. 3,050,785 to W. J. Cunningham. Matte surfaces may be achieved by incorporating "flatting agents" into the casting mixture, by applying matte surface transfer film to the mold prior to filling or by abrasive post-treatment of the sheet. A satin finish may be obtained by post-heating the sheet at about 120° C. to 150° C. for 0.1 to 0.25 hours. Embossed or structured surfaces may be achieved by applying suitable transfer paper or film to the mold prior to filling or by using molds having suitably embossed or structured surfaces.

The casting mixture may further comprise fibrous reinforcement to provide added strength to the sheet prepared by the process of this invention. The fibers may be selected from the group consisting of inorganic fibers such as, for example, glass, boron whiskers, and graphite; cellulosic fibers such as, for example, jute, sisal, and bagasse; and synthetic organic fibers such as, for example, nylon. When used, the amount of fibers may comprise up to about 30 percent by weight based on total casting mixture, the relative proportions of polymer-in-monomer solution to filler disclosed hereinabove being maintained.

The process of this invention is useful in preparing filled acrylic sheet having a thickness of about 0.1 to 4.0 inch. Preferably, the process of this invention is useful in preparing filled acrylic sheet having a thickness of about 0.1 to 1.0 inch. Especially preferred is the practice of this invention in closed cell cast polymerization operations to provide a filled acrylic sheet having a thickness of about 0.125 to 0.750 inch and having sheet thickness tolerances of plus or minus 0.020 inch to plus or minus 0.040 inch.

In a more preferred embodiment, the process of this invention comprises:

(a) providing about 30 to 50 parts of polymer in monomer per hundred parts total casting mixture wherein the solution contains 10 to 50 percent by weight of polymer and wherein (i) said polymer is polymerized from a mixture of 80 to 99.9 percent by weight of any $C_{1-8}$ alkyl methacrylate or mixtures thereof, 0.1 to 5.0 percent by weight of copolymerizable ethylenically unsaturated carboxylic acid, the balance to give 100 percent by weight of mixture comprising any $C_{1-8}$ alkyl acrylate or mixtures thereof; and wherein (ii) the monomer comprises any $C_{1-8}$ alkyl methacrylate or mixtures thereof;

(b) mixing into said solution 0.01 to 1.0 parts polymerization promoter system containing at least one polymerization initiator per hundred parts total casting mixture and 0.1 to 0.5 percent by weight based on total casting mixture of copolymerizable polyethylenically unsaturated compound;

(c) blending into said mixture from (b) above about 50 to 70 parts inert filler per hundred parts total casting mixture to form the casting mixture and subjecting casting mixture to a reduced pressure of about 25 to 30 psig to remove entrapped volatile gases;

(d) introducing said casting mixture to a closed cell mold; and (e) curing said casting mixture at about 50° C. to 60° C. for about 3 to 5 hours, then at about 130° C. for about 1 to 4 hours and then cooling to about 70° C. to 80° C. prior to parting.

The improved process of this invention to advantageous when utilized for the preparation of highly filled acrylic sheet having a thickness of about 0.1 to 4.0 inch, and, particularly, sheet having a thickness of about 0.1 to 1.0 inch, characterized by excellent flame retardancy, low smoke evolution, easy shop handleability, high chemical and stain resistance, thickness sensitivity, and decorability for use in bathrooms, kitchens, and various indoor and outdoor architectural applications. While any molding technique to make sheet articles may be used as mentioned hereinabove, the objectives of this invention are advantageously achieved by means of cell cast polymerization techniques, especially closed cell cast polymerization techniques, whereby any combination of the desired above-mentioned properties may be selectively imparted to the sheet. Further, the technology of foaming polymerizable, inert-filled acrylic compositions can be applied to the invention herein set forth. The improved process of this invention achieves the objects whereby low formulation (i.e. casting mixture) viscosity without filler settling characteristics is optimized, a shorter mixing time to achieve uniform distribution of casting mixture ingredients is permitted, the requirement of specialized mixing equipment so as to avoid deleterious effects on the polymer component of the casting mixture concommitant with higher viscosity casting mixtures is obviated, suitable liquidity for processability so as to satisfy the required short closed cell fill time is accomplished, desirable reaction kinetics within relatively rapid cycles to yield sheet fulfilling applications performance criteria are established, and decoration versatility is demonstrated in the preparation of filled acrylic sheet by means of closed cell cast polymerization techniques.

The filled acrylic sheet of this invention can be conveniently installed using conventional procedures as surfacing applied to a backing such as, for example, asbestos-cement board to give panels which may be cut using variety saws, preferably equipped with carbide tipped blades, drilled, routed, scraped, sanded, filed, and polished. Filled acryic sheet of greater thickness, for example 0.250 to 1.0 inch, may be used without backing; sheet of this thickness is readily prepared by the process of this invention as exemplified in Example 29 by employing a mold having suitably selected release characteristics.

The following examples are presented to illustrate but a few embodiments of the invention and are not to be construed as limiting in scope. All parts and percentages are by weight unless otherwise indicated. Abbreviations used in these examples are defined as follows: MMA=-methyl methacrylate; pMMA=poly methyl methacrylate; EA=ethyl acrylate; MAA=methacrylic acid; BMA=butyl methacrylate; BGDMA=1,3-butylene glycol dimethacrylate. As described hereinabove, commercially available agents used in the following examples are: Zelec ® UN, an aliphatic monoacid; Tinuvin ® P, a hydroxyphenyl substituted benzotriazole; and Triton ® X-100, an ethoxylated alkyl phenol having an OPE number of 9-10.

EXAMPLES 1–9:

In order to establish the improvement of this invention, wherein the incorporation of copolymerizable ethylenically unsaturated carboxylic acid into the polymer provides unexpected and significant reduction in viscosity of the highly filled polymer in monomer solution and the casting mixture (said solution further including polymerization promoter system) without settling of the filler, a series of filled solutions are prepared wherein the polymers are selected from the group of acid-containing (Examples 2, 3, 5, 7 and 9) and acid-free (Examples 1, 4, 6 and 8) polymers and copolymers and the viscosity of the filled solutions is measured and compared. Exemplary of these two types of polymers are the following:

TABLE I

| Ex. No. | Solution (Monomer:Polymer = 75:25) | Filler[a] | Solution:Filler | Brookfield RVF Viscometer, Number 4 Spindle | |
|---|---|---|---|---|---|
| | | | | 2 rpm | 20 rpm |
| 1 | MMA/P(MMA) | Alcoa C-331 | 35:65 | 90,000 cps | >10,000 cps |
| 2 | MMA/(MMA/MAA, 2%)cp[b] | Alcoa C-331 | 35:65 | 500 cps | 500 cps |
| 3 | MMA/(MMA/MAA, 1%)cp | Alcoa C-331 | 35:65 | ~100 cps | 290 cps |
| 4 | MMA/(MMA/EA, 13%)cp | Alcoa C-331 | 33:67 | 45,000 cps | >10,000 cps |
| 5 | MMA/(MMA/EA, 12%/MAA, 2%)cp | Alcoa C-331 | 33:67 | 500 cps | 650 cps |
| 6 | MMA/(MMA/EA, 13%)cp | Hydral 710 | 50:50 | 94,000 cps | >10,000 cps |
| 7 | MMA/(MMA/EA, 12%/MAA,2%)cp | Hydral 710 | 50:50 | 1,250 cps | 500 cps |
| 8 | MMA/P(MMA) | Camel White | 40:60 | 42,500 cps | 9,600 cps |
| 9 | MMA/(MMA/MAA, 2%)cp | Camel White | 40:60 | 250 cps | 200 cps |

[a]Alcoa C-331 = hydrated alumina, particle size = 8.0μ (mircons)
Hydral 710 = hydrated alumina, particle size = 0.5μ
Camel White = calcium carbonate, particle size = 2.0μ
[b]cp = copolymer

EXAMPLE 1

An acid-free polymer is prepared from the following monomer system:

| Component | parts by weight |
|---|---|
| MMA | 97.93 |
| n-dodecyl mercaptan | 2.01 |
| lauroyl peroxide | 0.0398 |
| acetyl peroxide | 0.0465 |
| t-butyl peroxide | 0.0070 |
| 2.8% oxalic acid in H$_2$O | 0.0025 |

EXAMPLE 2

An acid-containing polymer is prepared from the following monomer system:

| Component | parts by weight |
|---|---|
| MMA | 95.92 |
| MAA | 2.01 |
| n-dodecyl mercaptan | 2.01 |
| lauroyl peroxide | 0.0398 |
| acetyl peroxide | 0.0465 |
| t-butyl peroxide | 0.0070 |
| 2.8% oxalic acid in H$_2$O | 0.0025 |

The solutions shown in TABLE I are prepared by dissolving the polymer in MMA in a polymer:monomer ratio of 25:75 parts by weight. Filler, selected from the group of hydrated alumina (Alcoa C-331 and Hydral 710; different particle size) and calcium carbonate (Camel White), is mixed into the solution in varying proportions as shown in TABLE I. The resulting casting mixtures are blended, respectively, for three minutes using a high shear bench top stirrer. The temperature increases up to 120° F. during this operation. The mixtures are then cooled to 75° F. and the viscosity is measured at 75° F. at 2 rpm and at 20 rpm using a Brookfield Model RVF Viscometer with a Number 4 Spindle. The results, presented in TABLE I, show that the viscosity of casting mixtures prepared from acid-containing polymers is diminished by a factor of from 10 to 900 relative to the viscosity of casting mixture prepared from acid-free polymers.

EXAMPLES 10–19

Since previous laboratory experience with filled acrylic sheet has shown that testing mixtures based on formulations containing 60 percent to 70 percent by weight hydrated alumina and 0.2 percent to 0.4 percent by weight crosslinking monomer provided for desirable flammability, handleability and chemical and physical properties, a number of acrylic polymers are evaluated in polymer in monomer solution mixtures filled with 60 percent hydrated alumina (Alcoa C-331) and 0.2 percent BGDMA, based on total weight, to determine the optimal polymer in monomer concentration which imparts to the filled mixtures a desirable combination of flow characteristics and controlled settling properties. Filled mixtures are prepared for viscosity determination at 60 rpm and 6 rpm according to the following formulation: Alcoa C-331/polymer+MMA/BGDMA/Zelec® UN/stearic acid/Triton® X-100/Tinuvin® P=60.0/40.0/0.2/0.12/0.008/0.008/0.01. The data in TABLE II shows the viscosity and degree of "top clearing" by which a prior art filled mixture, Example 10 containing an acid-free polymer, is characterized. The results in TABLE II further show that filled mixtures containing low molecular weight acid-free polymers, Examples 11–13, yield lower viscosity as compared with Example 10 results. However, the low viscosity of these mixtures is accompanied by settling of the filler, which results in the characteristic known in the field as "top clearing."

TABLE II

| Ex. No. | Polymer Composition | Molecular Weight | Viscosity (cps) at 60/6 rpm vs. Polymer Concentration | | | | | | |
|---|---|---|---|---|---|---|---|---|---|
| | | | 4.0% | 6.0% | 8.0% | 8.8% | 10.0% | 12.0% | 14.0% |
| 10 | MMA/EA 99/1 | 100,000 | 500/1900 (8–16) | 1000/3500 (3–7) | 2300/6800 (2) | 3250/10,400 (1–2) | — | — | — |
| 11 | MMA/EA 96/4 | 59,000 | — | 170/<500 (9) | — | — | 1430/3500 (2) | — | — |
| 12 | MMA/EA 96/4 | 25,000 | — | 150/<500 (10) | — | — | 860/900 (3) | — | — |
| 13 | MMA/EA 55/45 | 60–70,000 | — | 320/800 (6) | 480/1000 (4) | — | 1250/1600 (2) | — | — |
| 14 | BMA/MMA/MAA 61.5/38.5/0.5 | 50,000 | — | 200/600 (6) | — | — | 570/1200 (5) | — | — |
| 15 | MMA/EA/MAA 84.3/12.6/2.0 | 76,000 | 100/200 (2) | 220/400 (2) | 1060/1100 (0) | — | 5200/4000 (0) | — | — |
| 16 | MMA/EA/MAA 84.3/12.6/2.0 | 45,000 | 50/<500 (3–4) | — | 300/<500 (3) | — | 1070/900 (0) | 4100/2900 (0) | — |
| 17 | MMA/EA/MAA 83.2/12.3/2.0 | 20,000 | 20/100 (6) | — | 90/100 (3) | — | 300/240 (2) | 540/500 (0) | 1700/1200 (0) |
| 18 | MMA/EA 99/1 +1% MAA | — | — | 1000/3200 (3) | — | 3000/8900 (2) | — | — | — |
| 19 | MMA/EA 99/1 +2% MAA | — | — | 960/2600 (3) | — | 2650/7400 (2) | — | — | — |

( ) = % top cleaning in 24 hrs. at ambient temp.

Filled mixtures containing low molecular weight polymers prepared according to the invention, which polymers contain MAA, Examples 14–17, unexpectedly have been found to display the combination of low viscosity and minimal settling of filler and, particularly, low thixotropy. Addition of MAA to the relatively high molecular weight polymer used to give the filled mixture of Example 10 yielded mixtures, Examples 18 and 19, which display diminished viscosity accompanied, however, by undiminished filler settling. The optimal combination of low viscosity, low settling and low thixotropic properties was observed in the use of the polymer of Example 15.

EXAMPLES 20–30

A. The physical properties of filled acrylic sheets prepared by closed cell cast polymerization followed by oven cure technique from casting mixtures having the formulations shown in TABLE III, wherein the polymer, in the initial polymer in monomer solution, is selected from a group having varying acid-free and acid-containing compositions, are shown in TABLE III. Examples 23, 26 and 27 represent sheets prepared according to the invention; Examples 20–22, 24–25, and 28–30 represent comparison sheets. In these examples, the casting mixture is introduced, independently, to 14×14×0.125 inch and 20×28×0.125 inch tempered glass cell mold having poly(vinyl acetate) coated vinyl spacers and metal mold clips. The filled molds are placed directly into the ovens, and then cured at 60° C. for 3 hours followed by 120° C. for 2 hours. Upon cooling, the resultant sheets are isolated by separating the glass molds.

TABLE III

| Example No. | % Acrylic Polymer | Brookfield Viscosity (cps) 60 rpm | Brookfield Viscosity (cps) 6 rpm | % Residual Monomer | Flexural Strength Stress (psi) | Flexural Strength Modulus of Elasticity (psi × 10⁶) | Work (in. lbs.) |
|---|---|---|---|---|---|---|---|
| 20 | 8.8 MMA/EA 99/1 Comparison | 3000 | 9600 | — | 8521 | 1.222 | 15.50 |
| 21 | 6.0 MMA/EA 99/1 Comparison | 850 | 3500 | 0.29 | 8427 | 1.212 | 16.76 |
| 22 | 8.0 MMA/BA 55/45 Comparison | 480 | 1000 | 0.19 | 6472 | 1.223 | 6.15 |
| 23 | 10.0 BMA/MMA/MAA 61.6/38.5/0.5 | 640 | 1700 | 0.21 | 6367 | 1.100 | 6.58 |
| 24 | 6.0 MMA/EA 99/1 2.0 MMA/EA/MAA 83.2/12.3/2.0 Comparison | 810 | 2040 | 0.21 | 8338 | 1.229 | 11.12 |
| 25 | 4.0 MMA/EA 99/1 5.0 MMA/EA/MAA 83.2/12.3/2.0 Comparison | 570 | 1400 | 0.23 | 6940 | 1.088 | 11.95 |
| 26 | 12.0 MMA/EA/MAA 83.2/12.3/2.0 | 550 | 750 | — | 5597 | 1.156 | 6.39 |
| 27 | 6.8 MMA/EA/MAA 84.3/12.6/2.0 | 302 | 575 | 0.21 | 8305 | 1.212 | 17.13 |
| 28 | 10.9 MMA/EA 99/1 Comparison | 5200 | 11,500 | 0.31 | 7940 | 1.218 | 25.59 |
| 29 | 5.4 MMA/EA 99/1 3.2 Polyester Comparison | 7300 | 18,000 | 0.33 | 6058 | 0.982 | 15.77 |
| 30 | 6.5 Polyester Comparison | 10,000 | 20,000 | 0.35 | 5391 | 0.769 | — |

The one difficulty observed in the use of acid-containing polymers in casting mixtures is increased mold adhesion, which causes "parting" problems, that is, difficulty in separating the product sheet from the glass mold. This difficulty is remedied by the incorporation of release agents in the casting mixture. The preparation of the sheet of Example 27 according to this invention is representative of the preparation of each of Examples 20-30 and is described in greater detail as follows:

B. EXAMPLE 27

A suitable mixing vessel is charged with 33.20 parts MMA monomer and the charge is stirred at about 20 to 30 rpm. Stearic acid, 0.20 parts, is dissolved in the stirred MMA monomer charge. This solution is charged with 6.80 parts polymer (MMA/EA/MAA=84.3/12.6/2.0), 0.20 parts BGDMA, 0.12 parts Zelec® UN, 0.01 parts Tinuvin® P and 0.001 parts terpinolene, and the resulting solution is stirred vigorously (50-60 rpm) for about 0.1 to 1.0 hour. This solution is then further charged with 60 parts hydrated alumina (Alcoa C-331) accompanied by vigorous stirring until the alumina is fully wetted; and the resulting mixture is further stirred vigorously for about 0.1 to 2 hours. This stirred mixture is still further charged with a polymerization initiator mixture of 0.04 parts t-butyl peroxypivilate and 0.02 parts t-butyl peracetate, and stirring is continued for about 0.1 to 0.5 hour to yield a casting mixture. This casting mixture is subjected to reduced pressure of about 25 to 30 psig for about 10 minutes and is then charged to a 20×28×0.125 glass cell mold. The sealed filled mold is placed into a forced air oven preheated to 60° C. and heated at 60° C. for 3 hours, heated at 120° C. for an additional 2 hours and then finally slowly cooled (10° C.-60 minutes) to about 70° C. to 80° C. whereupon the mold is parted to isolate the product sheet.

EXAMPLE 31

A 72×96×0.125 inch filled acrylic sheet according to the invention is prepared by vertical process closed cell casting followed by rapid 155 minute cycle cure as follows:

A suitable mixing vessel is charged with 33.20 padrts MMA monomer and the charge is stirred at about 20 to 30 rpm; then this solution is charged with 6.80 parts polymer (MMA/EA/MMA=84.3/12.6/2.0), 0.20 parts BGDMA, 0.20 parts stearic acid, 0.12 parts lecithin, 0.002 parts terpinolene and 0.1 parts Tinuvin® P and the resulting mixture is stirred vigorously (50 to 60 rpm) for about 0.1 to 1.0 hour. This solution is further charged with 60.0 parts hydrated alumina (Alcoa C-331) accompanied by vigorous stirring until the alumina is fully wetted. The resulting mixture is further stirred vigorously for about 0.1 to 0.5 hour to effect uniform distribution. This mixture is still further charged with a polymerization initiator mixture of 0.025 parts acetyl peroxide and 0.02 parts t-butyl peracetate and the resulting casting mixture is further stirred for about 0.1 to 0.5 hour. The casting mixture is then subjected to reduced pressure of about 25 to 30 psig for about 0.15 hour to remove entrapped volatile gases, and then charged to a 72×96×0.125 inch glass cell mold. The sealed mold is then subjected to a rapid 155 minute cycle cure wherein the casted mold is heated from 50° C. up to 130° C. under initial pressure of about 1,000 psi and then up to 2,000 psi and then down to atmospheric pressure and then allowed to cool to 80° C. over a period of 155 minutes. The mold is then parted and the filled acrylic sheet product is isolated. The physical properties of this product sheet are shown in TABLE IV. This sheet also exhibits excellent resistance to stains (for example, crayon, liquid shoe polish, ink, lipstick, hair color, tea, coffee, liquor, household disinfectant and furniture polish (aerosol spray) and chemicals (naptha, ethyl alcohol, amyl acetate, toluene, benzene, lacquer thinner, ethyl acetate, 3% aqueous hydrogen peroxide, 5% aqueous phenol, 6.6% aqueous urea, and concentrated Clorox).

TABLE IV

| | |
|---|---|
| 1) Flammability Performance | |
|    a) ASTM E-84 Tunnel Test | |
|       Flame Spread Rating | 70 (Class II) |
|       Smoke Density | 20 |
|    b) ASTM E-162 Radiant Panel Test | |
|       Flame Index | 15 |
|    c) Oxygen Index | 39 |
|    d) Smoke Density (R&H P-148D) | |
|       Max. Density, % | 1.0 |
|    e) NBS Smoke Chamber | |
|       Max. Density | 1–12 |
|    f) Room Corner Test Performance[2] | Excellent |
| 2) Specific Gravity | 1.698 |
| 3) Rockwell Hardness | M-80 |
| 4) Izod Impact, notched (ft. lbs.) | 0.3 |
| 5) Tensile Properties (ASTM D-638-68, 0.2"/min.) | |
|    Stress to Break (psi) | 3,400 |
|    Modulus of Elasticity (psi) | 1,400,000 |
| 6) Flexural Properties (ASTM D-790-66, 0.1"/min.) | |
|    Stress to Break (psi) | 7,300 |
|    Modulus of Elasticity (psi) | 1,200,000 |
| 7) Deflection Temp. Under Load (ASTM D-648-61) | |
|    264 psi, °F. | 212 |
|    264 psi, °C. | 100 |
| 8) Stain Resistance Tests for Sanitary Ware* | |
|    ANSI Z124.1 (1974 Standard) | Passes |
|    IAPMO (1972 Standard)-Stains | Passes |
|    IAPmo (1972 Standard)-Chemicals | Passes |
|    IAPMO (1972 Standard-Cigarette Burn | Passes |
| 9) Water Absorption (ASTM D-570) | |
|    % Wt. Gain, 23° C., 24 hours | 0.06 |
|    % Wt. Gain, 23° C., 7 days | 0.16 |

[1]Laminated to asbestos/cement board
[2]Two 8' × 8' walls, 8' × 8' ceiling panels on standard wallboard. Ignition source 6 lbs. plastic coated milk cartons in 32 gal. polyethylene trash can.
*Contact with crayon, ink, liquid shoe polish, lipstick, hair coloring, iodine, mercurochrome, tea, coffee, beet juice, dyes, liquor, household disinfectant and furniture polish aerosol sprays, naphtha, ethyl alcohol, ethyl acetate, amyl acetate, toluene, benzene, lacquer thinner, acetone, concentrated Clorox, 3% aqueous hydrogen peroxide, 5% aqueous phenol, 6% aqueous urea, or 10% household ammonia produces no permanent defects on filled acrylic sheet.

We claim:
1. A process for preparing highly filled acrylic articles having a thickness of about 0.1 to 4.0 inch comprising:
  (a) providing a solution of polymer in monomer, in a polymer:monomer ratio of from 1:9 to 1:1, wherein (i) said polymer is polymerized from a mixture comprising at least 50 percent by weight $C_{1-8}$ alkyl methacrylates or mixtures thereof and 0.01 percent to 8 percent by weight copolymerizable ethylenically unsaturated carboxylic acid and is characterized by a molecular weight of from about 20,000 to 100,000; and (ii) said monomer comprises at least 50 percent by weight $C_{1-8}$ alkyl methacrylate or mixtures thereof;
  (b) mixing into said solution a catalytic amount of polymerization promoter system;
  (c) blending into the mixture from (b) above 40 percent to 80 percent inert particulate filler, based on total amount, to form a casting mixture;
  (d) introducing said casting mixture to a mold; and
  (e) curing said casting mixture;
whereby the viscosity of said casting mixture is controlled and the settling of said filler is minimized by the presence of units from said carboxylic acid in said polymer.

2. The process of claim 1 wherein the copoly-merizable ethylenically unsaturated carboxylic acid is selected from the group consisting of methacrylic and acrylic acids.

3. The process of claim 1 wherein the polymer is polymerized from a mixture further comprising compounds selected from the group consisting of $C_{1-8}$ alkyl acrylates, styrenes, alkyl styrenes, vinyl acetate, acrylonitrile, and methacrylonitrile.

4. The process of claim 1 wherein the monomer further comprises compounds selected from the group consisting of $C_{1-8}$ alkyl acrylates, styrene, alkyl styrenes, vinyl acetate, acrylonitrile, methacrylonitrile, methacrylic acid, and acrylic acid.

5. A filled acrylic article prepared by the process of claim 1.

6. The process of claim 1 wherein the polymerization promoter system comprises, based on total casting mixture, about 0.01 to 1 parts per hundred of at least one polymerization initiator selected from the group of free radical polymerization catalysts.

7. The process of claim 6 wherein the polymerization promoter system further comprises one or more components selected from the group consisting of release agents, wetting agents, UV absorbers, and polymerization regulators.

8. The process of claim 1 wherein the inert filler is selected from the group consisting of hydrated alumina, calcium carbonate, clays, silicas, silicates, metal oxides, and magnesium oxychloride.

9. The process of claim 1 wherein the casting mixture further comprises one or more components selected from the group consisting of opacifiers, pigments, and decorative additives.

10. The process of claim 1 wherein the casting mixture further comprises up to about 30 percent by weight fibrous reinforcement selected from the group consisting of inorganic, cellulosic, and synthetic organic fibers based on total casting mixture.

11. The process of claim 1 wherein the solution further comprises 0.01 to 1 percent based on total casting mixture of copolymerizable polyethylenically unsaturated compound selected from the group consisting of alkylene, dimethacrylates, trimethacrylates, diacrylates, and triacrylates; divinyl benzene, triallyl cyanurate, and diallyl phthalate.

12. The process of claim 1 wherein the mold is closed cell, capped open cell, open-face, compression, injection or continuous-casting type.

13. The process of claim 12 wherein said mold has associated therewith a surface which comprises a smooth mold surface, an embossed mold surface, and a surface transfer film attached to the mold which surface is exposed to the casting mixture introduced thereby.

14. The process of claim 1 wherein the casting mixture is cured by heating at a temperature of from about 20° C. to 130° C. at a pressure of from atmospheric pressure to an elevated pressure of about 2,000 psi for a period of about 1 to 24 hours.

15. The process of claim 1 comprising:
(a) providing about 30 to 50 parts polymer in monomer solution per hundered parts total casting mixture wherein the solution contains 10 percent to 50 percent by weight polymer and wherein (i) the polymer is polymerized from a mixture of 80 to 99.9 percent by weight of any $C_{1-8}$ alkyl methacrylate or mixtures thereof and 0.1 percent to 5 percent by weight of copolymerizable ethylenically unsaturated carboxylic acid, the balance to give 100 percent by weight of mixture comprising any $C_{1-8}$ alkyl acrylate or mixtures thereof; and wherein (ii) the monomer comprises any $C_{1-8}$ alkyl methacrylate or mixtures thereof;
(b) mixing into said solution 0.01 to 1.0 parts polymerization promoter system containing at least one polymerization initiator per hundred parts total casting mixture and 0.1 to 0.5 percent by weight based on total casting mixture of copolymerizable polyethylenically unsaturated compound;
(c) blending into the mixture from (b) above about 50 to 70 parts inert filler per hundred parts total casting mixture to form the casting mixture and subjecting said casting mixture to a reduced pressure of about 25 to 30 psig to remove entrapped volatile gases;
(d) introducing said casting mixture to a closed cell mold; and
(e) curing said casting mixture at about 50° C. to 60° C. for about 3 to 5 hours, then at about 130° C. for about 1 to 4 hours at a pressure of from atmospheric pressure to about 2,000 psi and then cooling to about 70° C. to 80° C. prior to parting.

16. A filled acrylic sheet having a thickness of about 0.1 to 4.0 inch prepared by the process of claim 1.

17. A filled acrylic sheet having a thickness of about 0.1 to 1.0 inch prepared by the process of claim 14.

18. A filled acrylic sheet having a thickness of about 0.1 to 1.0 inch prepared by the process of claim 15.